Jan. 29, 1957     J. ROBELL     2,779,661
PROCESS FOR PRODUCING HYDRAZINE
Filed Oct. 29, 1952     2 Sheets-Sheet 1
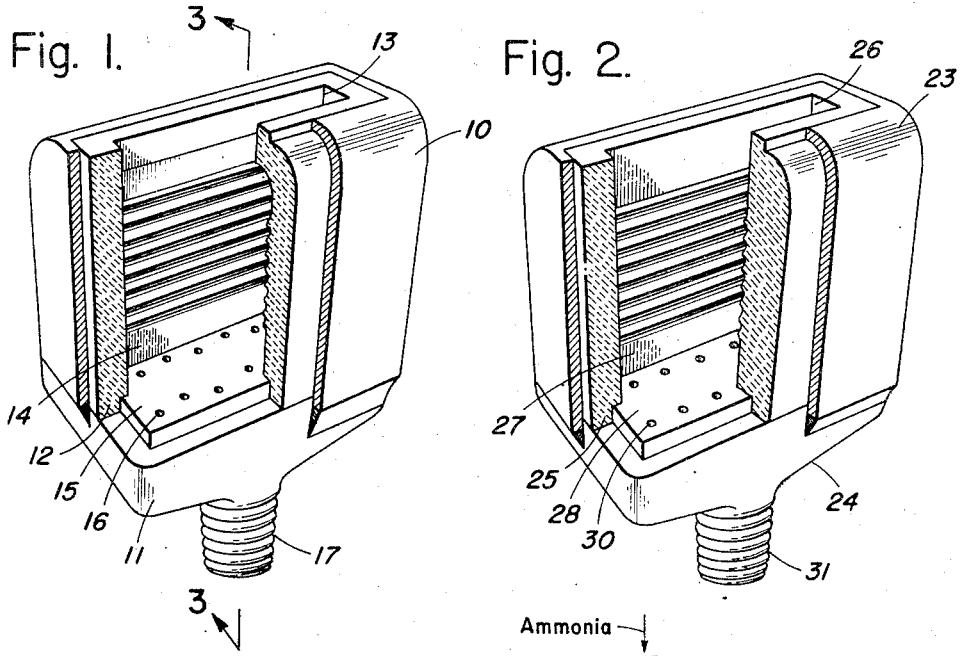
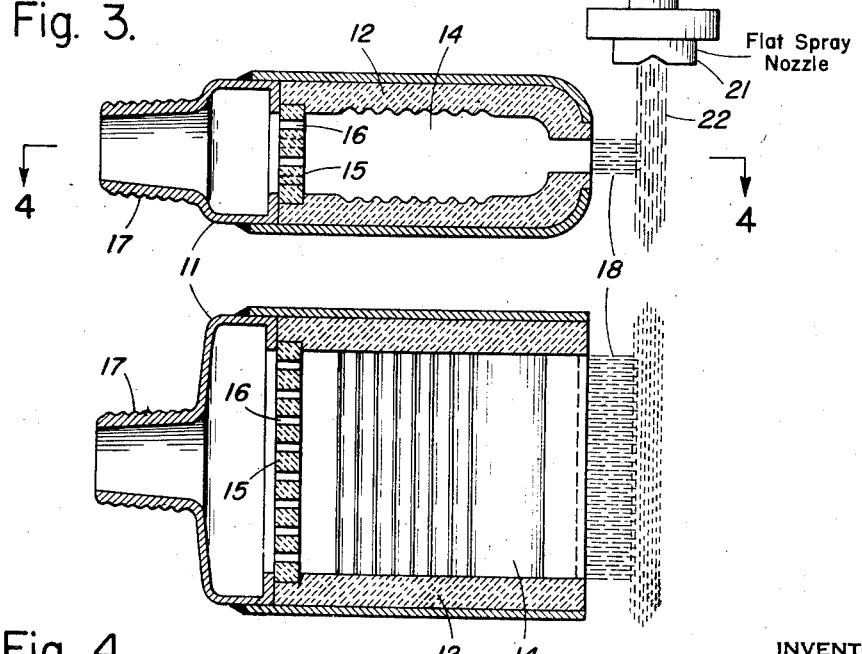
INVENTOR
John Robell
BY
Donald F. McCarthy
ATTORNEY N.C. = Non Condensable INVENTOR
John Robell

United States Patent Office 2,779,661
Patented Jan. 29, 1957

2,779,661
PROCESS FOR PRODUCING HYDRAZINE

John Robell, West Hempstead, N. Y., assignor to Guggenheim Brothers (1949), a copartnership Application October 29, 1952, Serial No. 317,533

4 Claims. (Cl. 23—190)

This invention relates to chemistry and has for an object the provision of an improved process for producing chemical compounds. More particularly, the invention contemplates the provision of a process for subjecting various chemical compounds to the action of various reagents at elevated temperatures to produce, in the gaseous state, valuable products of decomposition and transformation and comprising in different arrangements and proportions atoms contained in the original chemical compounds.

The terms "reaction," "decomposition" and "transformation" are used herein as substantial equivalents in order to cover the fields of direct chemical reaction, decomposition and polymerization or re-combination, among others. In some of its more specific aspects the invention is concerned with the conversion of saturated or stable compounds to unsaturated and relatively unstable or more highly reactive compounds.

The invention provides a process of the type in which bodies or streams of fluid reagents are brought into reacting relationship under conditions such as to promote desired reactions, decompositions or transformations with the production of bodies of gases containing products of the reactions, decompositions or transformations, and, thereafter, the gaseous products of the reactions, decompositions or transformations are subjected to conditions that promote or insure the preservation and recovery of the desired products. Thus, for example, the invention provides a process in which a chemical compound or radical or other component of a high-temperature body of gas requiring for its production a temperature higher than its maximum temperature of stability, or its decomposition temperature, and at which it necessarily exists in the gaseous state is cooled rapidly to a temperature below its maximum temperature of stability, or below its decomposition temperature.

The fluid reagents are brought into contact in a high-temperature reaction zone, and the gaseous reaction product flows to a relatively low-temperature cooling and stabilizing zone. The rates of flow of the fluid reagents and the fluid reaction products, the temperature of the reaction zone, and the temperature of the cooling and stabilizing zone are so regulated that sufficient time is allowed to provide the energy and develop the temperature required to produce a suitable rate and degree of reaction between the reagents and a suitable yield of the desired reaction product, and cooling of the desired reaction product to a temperature below its maximum temperature of stability, or below its decomposition temperature, is effected before an undesirable degree of decomposition of a desired reaction product can take place.

The energy required for producing temperatures and effecting reactions may be provided in any suitable manner, as, for example, by means of hot gases produced in any suitable manner and utilized directly or subjected to superheating prior to use, by means of open flames, by means of electric arcs established and maintained in contact with the reagents, by means of electric resistance elements disposed in the high-temperature reaction zones in contact with the reagents, by means of hot solid surfaces heated electrically or by combustion means, or by means of any two or more of such sources of energy.

Intimate mixing of the reagents to provide for effective reaction may be effected in any suitable manner. In order to effect suitably intimate mixing, I may employ extraneous mechanical mixing means, I may rely upon the effects products through the introduction into the reaction zone of fluid reagents at different angles, at different rates of speed, under different pressures, or in different fluid physical states, I may utilize the turbulence created by temperature changes or temperature changes and resulting changes of physical state (as from liquid to gas), or by changes of direction, or, I may utilize a combination of such factors.

The speed of removal of the desired reaction product and its associated gaseous reaction products will be determined by the rate and state of introduction of the reagents into the high-temperature reaction zone coupled, necessarily, with the effectiveness of means provided for permitting the flow of the gaseous reaction products from the high-temperature reaction zone to the low-temperature cooling and stabilization zone.

The speed employed for the flow of fluid reagents into the high-temperature reaction zone or the speed employed for the flow of gaseous reaction products from the immediate zone of reaction, or both, will be determined by the characteristics of the reaction products, particularly with respect to their rates of production and their actual or potential rates and times or periods of decomposition. When the rate of production of a desirable reaction product is high, the rate of introduction of reagents into the reaction zone and the rate of removal of reaction products from the reaction zone to the cooling and stabilizing zone should be high. If, on the other hand, the rate of production of a desirable reaction product is low, the rate of introduction of the reagents into the reaction zone may be low and the rate of removal of the reaction products may be relatively low. In the latter case, the predetermined rates of introduction and removal will depend, largely, upon the characteristics of the reaction products with respect to their lives or actual or potential rates and times or periods of decomposition at their temperature of production. When the rate of production exceeds the rate of decomposition at the temperature of production, the rate of removal may be reduced within the limits of economic factors. Of course, it is to be understood that the rates of introduction and removal referred to herein are relative, as the term "rate" implies, and they are not to be carelessly confused with speeds of flow, for, obviously, a quantity of fluid material introduced into a high-temperature reaction zone at a relatively low temperature may have its volume multiplied so that its rate of discharge through an outlet of the same cross-sectional area as the inlet may have its speed of flow multiplied in some proportion.

Dissipation of the sensible heat of the gaseous reaction product to provide for cooling and stabilization may be provided for in any suitable manner. Thus, for example, a fluid-cooled heat exchanger or other chilling means may be so disposed with respect to the zone of reaction as to permit either immediate or suitably delayed contact with the gaseous reaction products. Such a fluid-cooled heat exchanger should be so designed with respect to contact surfaces and cooling fluid flow as to permit effective absorption of the sensible heat of the gases, whether the gases are maintained at a fixed pressure or the gases are subjected to sudden expansion. Preferably, such a heat exchanger should be provided and associated with means permitting the use of a liquid having a high heat of vaporization at a temperature below the stabilizing temperature of the reaction products in order to provide for effective use in cooling of the heat absorption capacity resulting from the heat of vaporization.

In suitable cases, one or more of the reagents may be introduced in excess into or immediately adjacent to the reaction zone at a temperature lower than the temperature of reaction to provide for or promote effective cooling and stabilization of the desired reaction product. Such one or more reagents can be employed effectively in the liquid state to permit the utilization for cooling and stabilization purposes of the cooling effect resulting from the absorption of heat required for its vaporization or expansion. Similarly, a chemically non-reactive liquid substance having a high heat of vaporization such, for example, as water can be introduced into the reaction zone to permit utilization for cooling and stabilization purposes of the cooling effect resulting from the absorption of heat required for its vaporization.

The invention provides an effective process for converting or transforming stable or unsaturated compounds such as hydrocarbons and ammonia into relatively unstable or unsaturated compounds.

Among the preferred processes of my invention is that involving the use of an open combustion flame as a source of energy for producing temperatures and effecting reactions and transformations. The flame may function solely to provide heat for promoting one or more desired chemical reactions or transformations in the high-temperature reaction or transformation zone through its influence on a single compound or through its influence on two or more compounds or agents, or, the natures of the combustible materials and the oxidizing material employed in producing the flame may be such as to result in providing heat for promoting the one or more desired chemical reactions or transformations and, also, in providing one or more chemical agents or reagents that promote or enter into the desired chemical reactions or transformations. In a process employing an open combustion flame, one or more of the same or additional compounds or reagents that may be required for producing a desired end product are contacted with the flame in the form of a high-speed or high-velocity stream or body of gas. Processes involving the use of an open flame as a source of energy are described and claimed in my co-pending application Serial Number 270,821, filed February 9, 1952.

Another preferred process of my invention involves the use, as a source of energy for developing temperatures and effecting reactions and transformations, of a hot gaseous product formed in a suitable chamber in any suitable manner and issuing from an outlet port or orifice of the chamber in the form of a blast or tongue of controlled shape and cross-sectional area. The hot gaseous product employed preferably is a product resulting from the combustion (oxidation) of natural gas with air in an enclosed combustion chamber or in a multiplicity of enclosed combustion chambers each provided with an outlet port or orifice which, advantageously, may be in the form of an elongated slot to permit the issuance of a flat blast, that is, a blast having a relatively long cross-sectional axis and a relatively short cross-sectional axis normal to the long axis. Oxygen or oxygen-enriched air may be employed in burning the natural gas. The blast of hot gas may function solely for promoting one or more desired chemical reactions or transformations in the high-temperature reaction or transformation zone through its influence on a single compound or through its influence on two or more compounds or reagents, or the combustible material and the oxidizing material employed in producing the hot gaseous product may be such as to result in providing heat for promoting the one or more desired chemical reactions or transformations and, also, in providing one or more chemical agents or reagents that promote or enter into the desired chemical reactions or transformations. In a process employing a hot blast of combustion gas, one or more of the same or additional compounds or reagents that may be required for producing a desired end product are contacted with the hot gaseous blast in the form of a high-speed or high-velocity stream or body of gas.

The type of combustion chamber employed preferably is one provided with a casing or lining or packing of refractory material capable of functioning as surface combustion material to provide substantial acceleration of combustion, by irradiation or catalysis or otherwise, with the development of temperatures substantially higher than those capable of being developed through the use of gas-air burners of conventional types. Under appropriate conditions, the refractory casings, linings or packings may comprise refractory materials of the type of alumina, silica, magnesia, chromite, graphite, silicon carbide, lime, zirconia, zircon, mullite, berillia thoria, titania, or mixtures of such refractory materials. Basic silicates of known types also may be employed.

The high-speed stream of gas comprising a compound to be modified or transformed may be employed as a heat-dissipating or cooling agent, either alone or in conjunction with other heat dissipating or cooling means, to reduce the temperature of the gaseous reaction product and effect stabilization or prevent decomposition of the desired product. The speed or velocity of the body or stream of gas and its point or manner of contact with the hot blast should be such as to provide effectively for utilizing the heat energy of the blast while, at the same time, providing for sufficiently rapid cooling of the desired reaction or transformation product to effect its stabilization or prevent its decomposition. The speed or velocity of the stream of gas used for quenching may be in either the subsonic range or the supersonic range. Preferably, the speed or velocity of the stream of gas used for quenching or for quenching and reaction or transformation should be in excess of five hundred feet per second. In approaching the sonic range, shock waves may be encountered or developed, so I prefer to operate with a nozzle properly designed producing a shock free stream at the reaction zone so as to provide for smooth reaction and the production of uniform results. The gas employed for heat dissipation or cooling may be preheated to a temperature below the decomposition temperature of the one or more compounds or reagents contained therein, if desired, in order more effectively to promote reaction or transformation in that portion of the stream or body that contacts the hot blast at the desirable reaction or transformation temperature.

The high-speed stream or body of heat-dissipating or cooling gas may be contacted with the hot gas blast in any suitable manner. According to a preferred method of practicing the invention, the stream of heat-dissipating gas is formed as a flat spray having, in cross-section, short and long axes, and it is directed into contact with the hot gas blast in such manner that its long axis intersects the longitudinal axis of the gas blast. Highly effective contact may be achieved when the long axis of the spray and the median plane of the spray form right angles with the longitudinal axis of the hot gas blast and when contact is made immediately adjacent to the outlet port of the combustion chamber.

A flat blast preferably is employed, but a blast having any desired configuration may be employed in practicing the invention. The long axis of the spray may, advantageously, be greater in length than the width of the gas blast.

According to another preferred method of practicing the invention, the blast of hot gas and the stream of heat-dissipating gas are employed in a co-axial relationship. A blast of hot gas having any desired cross-sectional configuration is formed, and the stream of heat-dissipating gas is formed as an envelope surrounding the blast with a longitudinal axis coinciding with or parallel to the longitudinal axis of the blast. Preferably, the enveloping stream of gas is directed into contact with the hot gas blast immediately adjacent to the outlet port of the combustion chamber.

The surface of the flame or blast of hot gas or other heated element or source of heat energy should be of such length or quality or have such characteristics that the time of contact of the compound to be modified with the source of heat energy should be shorter than one one-hundredth of a second and, in the case of compounds like hydrazine, should be one ten-thousandth to a millionth of a second or shorter.

When the compound to be modified or transformed is used in developing the combustion gas blast, an additional quantity of the compound at a relatively low temperature may be introduced into the blast of hot gas resulting from combustion in order to effect cooling and further reaction, modification or transformation.

In the preferred form of my invention, I employ a blast of hot combustion gas produced by oxidation of methane with oxygen, air or oxygen-enriched air. The resulting gaseous product, when quenched with ammonia or with a saturated hydrocarbon compound will yield products comprising unsaturated hydrogen-nitrogen compounds or unsaturated hydrocarbon compounds.

The invention is of particular importance with respect to hydrazine production which can be effected through transformation of ammonia. Therefore, it will be described hereinafter with respect to hydrazine production in the utilization of principles and factors hereinbefore pointed out and discussed.

The present invention, in so far as it relates to the production of hydrazine, is based on my discovery that substantial amounts of hydrazine are produced when a combustible gas is burned with air, pure oxygen or oxygen-enriched air and the resulting hot gaseous combustion product is cooled or chilled by means of a high-velocity stream or body of ammonia.

I have found that greater or lesser amounts of hydrazine are produced from practically any gas burned or oxidized with oxygen or air to produce a high-temperature gaseous combustion product and the resulting high-temperature gaseous combustion product is cooled or chilled by means of a high-velocity stream of ammonia. Among the combustible gases employed are hydrogen, acetylene, ammonia, methane, ethane, propane, butane and carbon monoxide. These gases can either be premixed with oxygen before allowing them to burn or fed separately to a suitable diffusion type burner.

I prefer to use methane as the combustible gas and to employ natural gas for combustion because of its methane content.

I have found that the yield of hydrazine increases as the linear velocity of ammonia used for cooling or chilling the hot blast of gaseous combustion product is increased and that, within certain limits, this yield is independent of the volumetric ratio of ammonia to oxygen used. However, enough ammonia preferably should be used to cool the hot gaseous combustion product to a temperature low enough so that the hydrazine formed is stable and will not decompose thermally. Ammonia in amount insufficient to produce the desired cooling effect may be employed, and additional cooling means may be provided immediately adjacent to the reaction zone.

I have found that hydrazine is produced whether liquid or gaseous ammonia is used. Increased yields are obtained, however, with gaseous ammonia. A further increase in the yield is obtained if both the ammonia and the gases used for producing the blast of hot gaseous combustion product are preheated. The ammonia should not be preheated to such extent that the temperature of the resulting body of gaseous reaction products exceeds the decomposition temperature of hydrazine.

I have found, also, that the yields of hydrazine are increased when the blast of hot gaseous combustion products is contacted with the stream or body of ammonia at the shortest possible distance from the outlet port of the combustion chamber.

In carrying out a process of the invention involving the burning of methane with air in a suitable combustion chamber, or pre-combustion chamber, to produce a blast of hot gaseous combustion products, I may employ methane and air in any suitable ratios. In employing pure methane, I may employ air in greater or lesser proportions than that which provides the approximately theoretical ratio of 9.5 volumes of air to 1.0 volume of methane required for complete combustion. When natural gas is employed for its methane content, the ratio of air to natural gas employed should be varied to provide the air and natural gas in amounts corresponding to the theoretical ratio, or in amounts such that air is employed in an amount greater or lesser than the amount corresponding to that theoretically required for complete combustion of the particular natural gas product employed.

Three possible mechanisms could explain the formation of hydrazine in the process:

1. Thermal decomposition of ammonia according to the following reactions:

$$NH_3 = NH_2 + H$$
$$NH_2 + NH_2 = N_2H_4$$
$$H + H = H_2$$

2. Action of radicals on ammonia according to the following mechanism:

$$NH_3 + \text{radicals from flame} = NH_2 + H_2O \text{ (or } H_2)$$
$$NH_2 + NH_2 = N_2H_4$$

3. Hydrazine may be formed by direct oxidation of ammonia with oxygen from air according to:

$$2NH_3 + \tfrac{1}{2}O_2 = N_2H_4 + H_2O$$

According to this hypothesis methane may burn with air and thus provide the heat to bring the reactants to a temperature at which the above reaction will proceed at a reasonably high rate. The oxygen for the above reaction may be supplied by a very small part of the air introduced with the methane.

In a preferred method of operation for the production of hydrazine, 9.5 to 10.5 volumes of air are mixed with 1 volume of methane and the mixture is ignited in a refractory lined pre-combustion chamber provided with an outlet orifice of such dimensions and shape that a flat blast or tongue of hot gas issues therefrom. A flat stream of gaseous ammonia emerging from a suitable nozzle is directed at right angles to the longitudinal axis of the gas blast or tongue. Contact of the ammonia with the hot blast or tongue of gas results in the production of hydrazine which followed immediately by chilling and cooling the resulting body of gas containing the hydrazine. The stream of reacting and quenching or cooling ammonia should be directed against the blast or tongue of hot gas at a point, along a line or in a plane as close as is reasonably possible to the outlet orifice of the pre-combustion chamber in order that substantially the total heat energy contained in the blast may be conserved to permit its utilization substantially at the temperature of production of the gas.

In carrying out pilot plant operations involving the ignition and burning of a mixture of methane and air under different conditions of operation with respect to such factors as quantities and ratios of air and methane, preheating of the reagents to different temperatures, and contacting of the hot gaseous blast with quenching or cooling ammonia, I have obtained reaction products which, upon cooling and condensing, formed aqueous condensates containing from 0.77 percent to 1.85 percent of hydrazine by weight.

The following data illustrate conditions maintained and results obtained in carrying out a process, which may be considered a typical process of the invention, in which methane was burned with air in a pre-combustion chamber provided with a rectangular outlet of restricted cross-sectional area to produce a flat blast or tongue of hot gas which issued from the outlet and against which a flat stream of ammonia of a width substantially the same as the width of the blast was directed from a nozzle disposed 1.5 millimeters from the outlet orifice and 1.0 millimeter from the plane of the blast or tongue of gas with its median plane forming right angles with the median plane and the longitudinal axis of the gas blast:

| | |
|---|---|
| Quantity of methane fed to the burner_ | 4.35 S. C. F. H. |
| Quantity of air fed to the burner_____ | 45.6 S. C. F. H. |
| Ratio of methane to air_____ | 1 to 10.5 |
| Ammonia quenching stream_____ | 192.5 S. C. F. H. |
| Temperature of reaction products_____ | 415° F. |
| Ratio of ammonia to oxygen burned___ | 22.2 |
| Hydrazine in liquid phase in percent by weight of the condensed aqueous product_____ | 1.01% |
| Velocity of ammonia at burner slot____ | approx. 1650 feet per sec. |

(S. C. F. H.=cubic feet per hour under standard conditions of 60° F. and 30 inches Hg).

The invention will be better understood from a consideration of the following description in conjunction with the accompanying drawings in which Fig. 1 is a perspective of a combustion chamber or burner provided with a rectangular outlet port and having an interior of rectangular cross-section but of greater cross-sectional area than the cross-sectional area of the outlet port, a portion of the wall of the chamber being broken away to show the interior;

Fig. 2 is a perspective of a combustion chamber similar to that shown in Fig. 1 but differing therefrom in that the outlet port and the interior of the chamber are of similar cross-sectional areas;

Fig. 3 is a section taken substantially along the line 3—3 of Fig. 1;

Fig. 4 is a section taken substantially along the line 4—4 of Fig. 3; and

Figure 5:
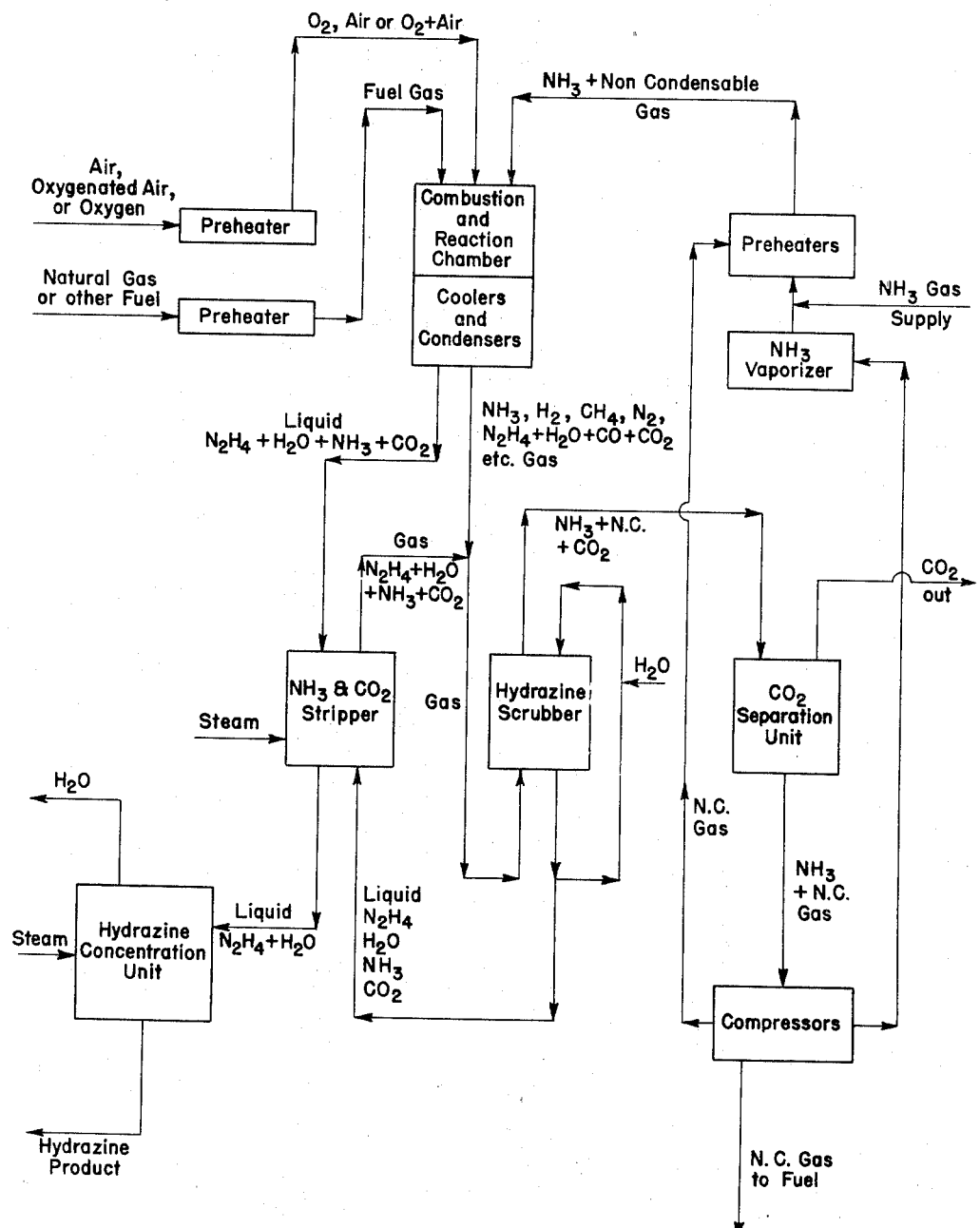
Fig. 5 is a flowsheet illustrating a process for producing hydrazine in accordance with the invention.

The combustion chamber or burner shown in Figs. 1, 3 and 4 of the drawing comprises an outer metal casing 10 and a metal plenum chamber 11 to which the outer casing 10 is attached. The interior of the casing is provided with a high-temperature insulating refractory lining 12 having corrugated walls, so shaped as to provide a rectangular outlet port or blast opening 13 and a rectangular interior combustion chamber 14 of greater cross-sectional area than the cross-sectional area of the outlet port or blast opening 13, and a ceramic plate 15 provided with ports 16 communicating with the interior of the plenum chamber 11 and the interior of the combustion chamber. The total area of the ports 16 preferably is smaller than the cross-sectional area of the blast opening or outlet port 13. A single pipe connection 17 communicating with the interior of the plenum chamber is formed integrally with the plenum chamber. All parts of the combustion chamber or burner are interlocked by their shapes and the sequence of assembly.

In the operation of the combustion chamber or burner, the pipe connection 17 is connected to a source of premixed air and combustible gas (not shown). The mixture of gas and air entering the interior of the combustion chamber through the ports 16 burns within the combustion chamber or burner. Combustion proceeds along and in contact with the surface of the high-temperature insulating refractory lining 12. The corrugated walls of the lining attain white hot incandescence, and intense radiation plays from wall to wall across the path of travel of the gases during the course of their interreaction thus accelerating the rate of combination of the combustible gas and the oxygen of the air. A super-heated blast or tongue of gas 18 (Figs. 3 and 4), undiluted by secondary air, issues from the outlet port or blast opening 13.

As indicated by Figs. 3 and 4, operation of the combustion chamber or burner shown in Fig. 1 produces a flat blast of gas 18 having a relatively short vertical axis and a relatively long horizontal axis. In employing such a blast of hot gas to produce hydrazine, an ammonia spray device 19 provided with a flat spray nozzle 21 is so disposed as to deliver into contact with the blast of hot gas a flat spray 22 having in cross-section long and short axes with the long axis greater in length than the width of the blast of hot gas, the flat spray of ammonia being directed into contact with the blast of hot gas in such manner as to project beyond the side edges of the blast of hot gas with its long axis intersecting the longitudinal axis of the blast of hot gas adjacent to the plane of issuance of the blast of hot gas from the outlet port or blast opening 13 and with its long axis and its median plane forming right angles with the longitudinal axis of the blast of hot gas.

The combustion chamber or burner shown in Fig. 2 is similar to that shown in Fig. 1, comprising an outer metal casing 23 and a metal plenum chamber 24 to which the casing 23 is attached. The interior of the casing is provided with a high-temperature insulating lining 25 having corrugated walls, so shaped as to provide a rectangular outlet port or blast opening 26 and a rectangular interior combustion chamber 27 having a cross-sectional area substantially the same as the cross-sectional area of the outlet port or blast opening 26, and a ceramic plate 28 provided with ports 30 communicating with the interior of the plenum chamber 24 and the interior of the combustion chamber. As in the case of the burner or combustion chamber shown in Fig. 1, the total area of the ports 30 preferably is smaller than the cross-sectional area of the blast opening or outlet port. A single pipe connection 31 communicating with the interior of the plenum chamber is formed integrally with the bronze casting forming the plenum chamber.

In the operation of the combustion chamber of burner shown in Fig. 2, the pipe connection 31 is connected to a source of pre-mixed air and combustible gas (not shown). The burner shown in Fig. 2 functions, in operation, to develop conditions and produce results substantially identical with the conditions developed and results produced in the operation of the burner or combustion chamber shown in Fig. 1.

The specific procedure outlined in Fig. 5 will be clear from a consideration of the legends applied thereto and the flow chart forming a part thereof. The flow sheet of Fig. 5 shows a process for producing hydrazine in which preheated combustible gas and pre-heated air are reacted in a suitable combustion chamber in the presence of ammonia in the gaseous state, and the gaseous reaction product is first contacted with a primary cooler employing water as an internal cooling agent (as in a tubular exchanger) and, thereafter, is contacted with a secondary cooler employing liquid ammonia as an internal cooling agent (as in a tubular heat exchanger). A liquid product containing hydrazine and a gaseous product containing hydrazine are produced, and the two products are treated appropriately to effect the recovery of hydrazine. Provision is made for the separation and recovery of unaltered ammonia associated with the hydrazine and for the utilization of hydrogen and nitrogen associated with the hydrazine for the regeneration of ammonia for re-use in the process.

In the process of the invention involving the use of a blast of hot gas in the production of hydrazine, I prefer to operate under conditions such as to permit utilization of the blast of hot gas at a temperature as close as possible to its temperature of production. In some instances, desirably high temperatures can be developed by employing combustible mixtures consisting of substantially pure oxygen or oxygen enriched air and a substantially pure combustible gas in stoichiometric proportions. Pre-heating of the components of combustible mixtures which also contain diluent materials such, for example, as nitrogen, when air or oxygen-enriched air is used as the source of oxygen, can be utilized for developing temperatures higher than those directly attainable when the components are ignited at normal atmospheric temperatures. Similarly, pre-heating may be employed to aid in developing higher temperatures than those attainable through the ignition at normal atmospheric temperatures of combustible mixtures consisting of pure components in stoichiometric proportions.

I claim:

1. The method of producing hydrazine which comprises directing a heated blast of gases into a reaction zone and forming in the reaction zone a stream of hot gases having a temperature substantially higher than the decomposition temperature of hydrazine, said heated blast of gases being formed by pre-ignition and burning of a combustible mixture of gases at a point adjacent said reaction zone, directing a separate stream of ammonia at a high velocity into contact with the stream of hot gases of combustion within the reaction zone and forming therein a high-temperature gaseous reaction product comprising: (1) hydrazine resulting from transformation of a portion of the ammonia; (2) unaltered ammonia, and (3) products of combustion resulting from pre-ignition and burning of the combustible mixture of gases, removing the high-temperature gaseous reaction product from the hot reaction zone to a cooling zone and cooling said product to a temperature at which hydrazine contained therein is stable, and separating hydrazine from other substances associated therewith in the cooled product, ammonia being introduced into the hot reaction zone; (1) at a rate such as to provide a time of contact of the ammonia with the stream of hot gases of combustion substantially shorter than one one-hundredth (1/100) of a second; (2) at a temperature substantially below the temperature of said heated blast of gases; and (3) in an amount in excess of that required for reaction, such as to aid materially in cooling the gaseous reaction product to a temperature at which hydrazine contained therein is relatively stable.

2. The method of producing hydrazine which comprises directing a heated blast of gases into a reaction zone and forming in the reaction zone a stream of hot gases having a temperature substantially higher than the decomposition temperature of hydrazine, said heated blast of gases being formed by pre-ignition and burning of a combustible mixture of gases at a point adjacent said reaction zone, directing a separate stream of ammonia at a high velocity into contact with the stream of hot gases of combustion within the reaction zone and forming therein a high-temperature gaseous reaction product comprising: (1) hydrazine resulting from transformation of a portion of the ammonia; (2) unaltered ammonia; and (3) products of combustion resulting from pre-ignition and burning of the combustible mixture of gases, removing the high-temperature gaseous reaction product from the hot reaction zone to a cooling zone and cooling said product to a temperature at which hydrazine contained therein is stable, and separating hydrazine from other substances associated therewith in the cooled product, ammonia being introduced into the hot reaction zone; (1) at a rate such as to provide a time of contact of the ammonia with the stream of hot gases of combustion substantially shorter than one one-hundredth (1/100) of a second; (2) at a temperature substantially below the temperature of said heated blast of gases; and (3) in an amount in excess of that required for reaction, such as to aid materially in effecting removal of the gaseous reaction product from the hot reaction zone and in rapidly cooling the gaseous reaction product to a temperature at which hydrazine contained therein is relatively stable.

3. The method of producing hydrazine which comprises directing a heated blast of gases into a reaction zone and forming in the reaction zone a stream of hot gases having a temperature substantially higher than the decomposition temperature of hydrazine, said heated blast of gases being formed by pre-ignition and burning of a combustible mixture of gases including methane at a point adjacent said reaction zone, directing a separate stream of ammonia at a high velocity into contact with the stream of hot gases of combustion in the reaction zone and forming therein a high-temperature gaseous reaction product comprising: (1) hydrazine resulting from transformation of a portion of the ammonia; (2) unaltered ammonia; and (3) products of combustion resulting from pre-ignition and burning of the combustible mixture of gases including methane, removing the high-temperature gaseous reaction product from the hot reaction zone to a cooling zone and cooling said product to a temperature at which hydrazine contained therein is stable, and separating hydrazine from other substances associated in the cooled product, ammonia being introduced into the hot reaction zone; (1) at a rate such as to provide a time of contact of the amomnia with the stream of hot gases of combustion substantially shorter than one one-hundredth (1/100) of a second; (2) at a temperature substantially below the decomposition temperature of hydrazine; and (3) in an amount in excess of that required for reaction, such as to aid materially in cooling the gaseous reaction product to a temperature at which hydrazine contained therein is relatively stable.

4. The method of producing hydrazine which comprises directing a heated blast of gases into a reaction zone and forming in the reaction zone a stream of hot gases having a temperature substantially higher than the decomposition temperature of hydrazine, said heated blast of gases being formed by pre-ignition and burning of a combustible mixture of gases including methane within a combustion chamber located adjacent said reaction zone and having the hot products of combustion produced therein directed into said reaction zone, directing a separate stream of ammonia at a high velocity into contact with the stream of hot gases of combustion within the reaction zone and forming therein a high-temperature gaseous reaction product comprising: (1) hydrazine resulting from transformation of a portion of the ammonia; (2) unaltered ammonia; and (3) products of combustion resulting from pre-ignition and burning of the combustible mixture of gases including methane, removing the high-temperature gaseous reaction product from the hot reaction zone to a cooling zone and cooling said product to a temperature at which hydrazine contained therein is stable, and separating hydrazine from other substances associated therewith in the cooled product, ammonia being introduced into the hot reaction zone, (1) at a rate such as to provide a time of contact of the ammonia with the hot stream of gases of combustion substantially shorter than one one-hundredth (1/100) of a second, (2) at a temperature substantially below the decomposition temperature of hydrazine, and (3) in an amount in excess of that required for reaction, such as to aid materially in rapidly cooling the gaseous reaction product to a temperature at which hydrazine contained therein is relatively stable.

References Cited in the file of this patent

UNITED STATES PATENTS

| 2,072,375 | McCallum | Mar. 2, 1937 |
| 2,596,421 | McKinnis | May 13, 1952 |

OTHER REFERENCES

J. W. Mellor's: "Inorganic and Theoretical Chemistry," vol. 8, pages 208–211, 221.

Serial No. 379,872, Ebner (A. P. C.), published April 27, 1943.